(12) United States Patent
Nakajima

(10) Patent No.: US 9,621,349 B2
(45) Date of Patent: Apr. 11, 2017

(54) APPARATUS, METHOD AND COMPUTER-READABLE MEDIUM FOR USER AUTHENTICATION

(71) Applicant: FUJITSU LIMITED, Kawasaki-shi, Kanagawa (JP)

(72) Inventor: Naoya Nakajima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/315,464

(22) Filed: Jun. 26, 2014

(65) Prior Publication Data

US 2015/0033029 A1 Jan. 29, 2015

(30) Foreign Application Priority Data

Jul. 24, 2013 (JP) .................................. 2013-153492

(51) Int. Cl.
| | | |
|---|---|---|
| G06F 21/00 | (2013.01) | |
| H04L 9/32 | (2006.01) | |
| H04L 29/06 | (2006.01) | |
| G06F 21/31 | (2013.01) | |

(52) U.S. Cl.
CPC .......... H04L 9/3226 (2013.01); H04L 9/3239 (2013.01); H04L 63/083 (2013.01); G06F 21/31 (2013.01)

(58) Field of Classification Search
CPC ...... G06F 21/31; G06F 7/1008; G06F 7/1009; H04L 63/08; H04L 63/083
See application file for complete search history.

(56) References Cited

U.S. PATENT DOCUMENTS

| | | | | |
|---|---|---|---|---|
| 7,207,058 | B2 * | 4/2007 | Barrett ................... | G06F 21/33 |
| | | | | 705/51 |
| 8,230,487 | B2 * | 7/2012 | Feil .................................. | 726/5 |
| 2005/0108575 | A1 * | 5/2005 | Yung .................. | H04L 63/0807 |
| | | | | 726/4 |
| 2008/0270300 | A1 * | 10/2008 | Jones et al. ..................... | 705/41 |
| 2013/0204937 | A1 * | 8/2013 | Fernando ............... | H04L 67/22 |
| | | | | 709/204 |

FOREIGN PATENT DOCUMENTS

| | | |
|---|---|---|
| JP | 2001-256188 | 9/2001 |
| JP | 2004-110364 | 4/2004 |
| JP | 2010-108116 | 5/2010 |
| JP | 2012-137932 | 7/2012 |

* cited by examiner

*Primary Examiner* — Ali Abyaneh
*Assistant Examiner* — Shaqueal Wade
(74) *Attorney, Agent, or Firm* — Staas & Halsey LLP

(57) ABSTRACT

An apparatus includes a memory; and a processor coupled to the memory and configured to: authenticate an identification for accessing a first service by comparing a password associating with the identification with an first encrypted password that is generated by encrypting the password on the basis of a first encryption policy to authenticate an access to the first service; and provide a second service with the identification and the password to cause to generate information when an authentication of the identification is successful, the information being accessed to authenticate the identification when the second service is accessed based on the identification and the password.

15 Claims, 11 Drawing Sheets

FIG. 5

| NAME | EXAMPLE |
|---|---|
| USER ID | tokkyo_user01 |
| USER PASSWORD (PLAIN TEXT) | password1234 |

| ATTRIBUTE NAME | MEANING | EXAMPLE |
|---|---|---|
| DN | DISTINGUISHED NAME | cn=tokkyo_user01,cn=Users,dc=example,dc=com |
| userPassword | USER PASSWORD | {SSHA}YYqvQeYI/fMbk2xcnn/IInXX/w5IjSTRiZCn2Q |
| objectClass | OBJECT TYPE | organizationalPerson |
| uid | USER ID | tokkyo_user01 |
| cn | FULL NAME | tokkyo taro |
| sn | FAMILY NAME | tokkyo |
| givenName | FIRST NAME | taro |
| mail | MAIL ADDRESS | xxxx@yy.zzz |

| ATTRIBUTE NAME | MEANING | EXAMPLE |
|---|---|---|
| DN | DISTINGUISHED NAME | cn=tokkyo_user01,cn=Users,dc=example,dc=com |
| unicodePwd | USER PASSWORD | |
| objectClass | OBJECT TYPE | organizationalPerson |
| uid | USER ID | tokkyo_user01 |
| cn | FULL NAME | tokkyo taro |
| sn | FAMILY NAME | tokkyo |
| givenName | FIRST NAME | taro |
| mail | MAIL ADDRESS | xxxxx@yy.zzz |

701

APPARATUS, METHOD AND COMPUTER-READABLE MEDIUM FOR USER AUTHENTICATION

CROSS-REFERENCE TO RELATED APPLICATION

This application is based upon and claims the benefit of priority of the prior Japanese Patent Application No. 2013-153492 filed on Jul. 24, 2013, the entire contents of which are incorporated herein by reference.

FIELD

The embodiments discussed herein are related to an apparatus, a method, and a computer-readable medium.

BACKGROUND

There are services for executing information processes such as a database process and a transaction process in response to requests from users. In order for a user to use a service, user authentication is executed to confirm whether or not the user is a person who has a right to receive the service. For the user authentication, account information that includes a user identification (ID) and a password is used.

The account information with the password encrypted is stored in an authentication apparatus for determining whether to authenticate users. Methods for encrypting passwords for services may vary depending on the services. Thus, if the user changes a certain service used by the user to another service to be used by the user, and methods for encrypting passwords for the services are different, account information for the certain service used before the change is unable to be used as account information for the other service to be used after the change. There is a method for issuing a tentative password to the user in order to log into the service to be used after the change and causing the user to perform a change operation for the change from the certain service to the other service.

As a related technique, there is an authentication changing apparatus that has a database for storing new authentication information, old authentication information used for a service previously used, and change information representing whether or not a change of authentication is confirmed and approved, for example. When a user accesses the authentication changing apparatus, the authentication changing apparatus receives the new authentication information or the old authentication information from the user, executes user authentication, and updates the change information.

Japanese Laid-open Patent Publication No. 2012-137932 is an example of related art.

SUMMARY

According to an aspect of the invention, an apparatus includes a memory; and a processor coupled to the memory and configured to: authenticate an identification for accessing a first service by comparing a password associating with the identification with an first encrypted password that is generated by encrypting the password on the basis of a first encryption policy to authenticate an access to the first service; and provide a second service with the identification and the password to cause to generate information when an authentication of the identification is successful, the information being accessed to authenticate the identification when the second service is accessed based on the identification and the password.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of user authentication information;

FIG. 6 is a diagram illustrating an example of user information for a directory service used before a change;

FIG. 7 is a diagram illustrating an example of user information for a directory service to be used after the change;

DESCRIPTION OF EMBODIMENTS

First, a consideration made by the inventors is explained below. For the related technique, if a user changes a certain service to another service, and encryption methods to be used for the services are different, account information for the certain service used before the change is unable to be used for the other service to be used after the change, information to be used for the generation of account information for the service to be used after the change is registered, and a process is complex.

In the method for issuing a tentative password and causing a user to perform a change operation, the user discloses personal information such as a mail address and an address in order to receive the tentative password. Since an email or a postal mail is sent in order for the user to receive the tentative password, it is difficult to secure security for the service to be used after the change due to social hacking and the like. If the user wants to use the same password for the service used before the change and for the service to be used after the change and enters a wrong password, the same password may not be able to be used for the service to be used after the change.

It is considered that an external apparatus that is able to access the services, centrally manages account information of the user, and generates an account for the service to be used after the change is used. However, information that identifies an encryption method for the service to be used after the change is held by the external apparatus in order to generate the account, and it is therefore difficult to secure the security for the service to be used after the change.

According to embodiments described later, an account for the service to be used after the change may be generated in consideration of the security for the service to be used after the change in order to change the service used.

The embodiments are described in detail with reference to the accompanying drawings.

First Embodiment

First Example of Account Generation Support Method

Figure 1:
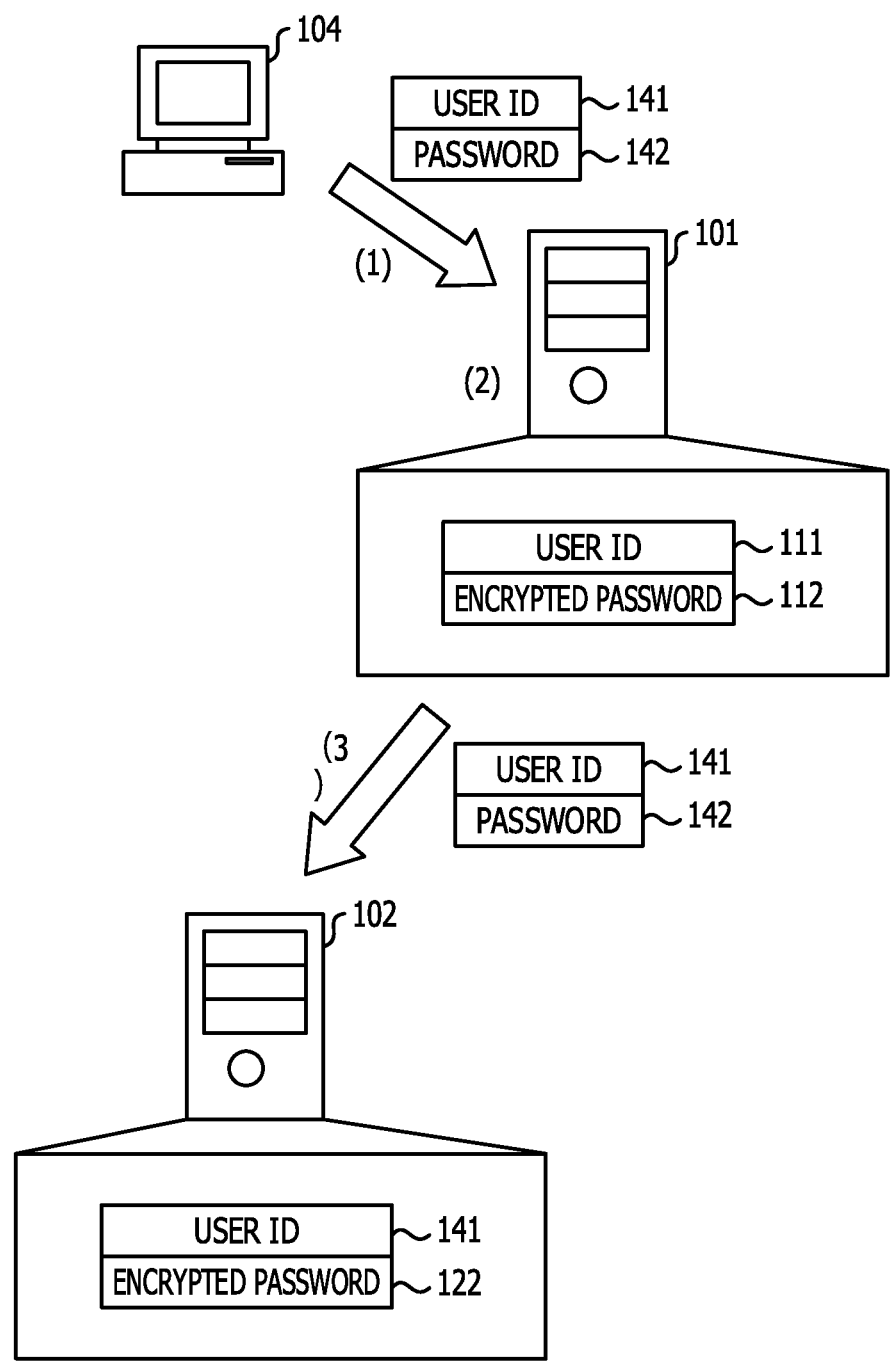
FIG. 1 is a diagram describing a first example of an account generation support method according to a first embodiment.

FIG. 1 is a diagram describing a first example of an account generation support method according to a first embodiment. Referring to FIG. 1, an account generation supporting apparatus 101 is a computer configured to support the generation of account information for a service to be used after a change in order to change a certain service to the service to be used after the change. The example illustrated in FIG. 1 describes a case in which the account generation supporting apparatus 101 functions as a managing apparatus for executing an authentication process for the service used before the change. In this case, the account generation supporting apparatus 101 stores account information to be used to determine whether a user of the service used before the change is authenticated.

Each of the services is to execute an information process such as a database process or a transaction process in response to a request from a user. The authentication process is a process of confirming whether or not a user is a person who has a right to receive a service. Account information includes a user ID and a password encrypted by an encryption process, and the user ID is information that identifies a user to which a service is provided.

The encryption process is to convert data so as to inhibit details of the data from being recognized by a third party. The account generation supporting apparatus 101 uses a hash function to encrypt the password. The hash function is a function that enables a value to be calculated from a data block and does not enable the original data block to be obtained from the calculated value. There are many methods for encrypting data. For example, a secure hash algorithm (SHA) is known as the hash function. The account generation supporting apparatus 101 uses at least one of the encryption methods to encrypt the password.

In the example illustrated in FIG. 1, the account generation supporting apparatus 101 uses user authentication information and accounting information stored in the account generation supporting apparatus 101 to determine whether to authenticate a user of a first service used before a change from the first service to a second service. The user authentication information includes a user ID 141 and an unencrypted plain text password 142 associated with the user ID 141 and received. The user ID 141 identifies a user who uses the first service.

A managing apparatus 102 is a computer configured to determine whether to authenticate a user of the second service to be used after the change. A client apparatus 104 is a computer that is used for the user to request the account generation supporting apparatus 101 to change a service. The client apparatus 104 transmits the user authentication information entered by the user to the account generation supporting apparatus 101.

In the first embodiment, the account generation supporting apparatus 101 receives a request to change the service from the client apparatus 104. The account generation supporting apparatus 101 acquires the user authentication information from the client apparatus 104. After that, the account generation supporting apparatus 101 uses the user authentication information and the account information to execute the authentication process so as to determine whether to authenticate the user. After the authentication process succeeds, the account generation supporting apparatus 101 causes the managing apparatus 102 to generate account information. The first example of the account generation support method to be executed by the account generation supporting apparatus 101 is described below in detail.

(1) The account generation supporting apparatus 101 receives the request to change the service from the client apparatus 104 and acquires the user authentication information. The account generation supporting apparatus 101 acquires, as the user authentication information, the user ID 141 and the password 142 associated with the user ID 141 from the client apparatus 104.

(2) The account generation supporting apparatus 101 executes the authentication process. In this case, the account generation supporting apparatus 101 executes the authentication process using account information including a user ID 111 stored in the account generation supporting apparatus 101 and an encrypted password 112 stored in the account generation supporting apparatus 101 and the user authentication information including the user ID 141 and the password 142. For example, if the user ID 141 matches the user ID 111, and the password 142 encrypted by the encryption method of the account generation supporting apparatus 101 matches the encrypted password 112, the account generation supporting apparatus 101 determines that the authentication process is successful.

(3) If the authentication process is successful, the account generation supporting apparatus 101 causes the managing apparatus 102 to generate account information. In this case, the account generation supporting apparatus 101 causes the managing apparatus 102 to generate the account information using the user ID 141 acquired from the client apparatus 104 and the password 142 acquired from the client apparatus 104. If the user ID 141 matches the user ID 111, the user ID 111 may be used instead of the user ID 141.

The managing apparatus 102 uses an encryption method of the managing apparatus 102 to encrypt the password 142 acquired from the account generation supporting apparatus 101 and thereby generates an encrypted password 122 from the password 142. Then, the managing apparatus 102 stores the account information that includes the user ID 141 and the encrypted password 122.

As described above, the account generation supporting apparatus 101 may execute the authentication process using the user ID 141 received from the client apparatus 104 and the password 142 associated with the user ID 141 and received from the client apparatus 104. If the authentication process is successful, the account generation supporting apparatus 101 may cause the managing apparatus 102 to generate the account information using the received user ID 141 and the received password 142. Thus, the account information for the second service may be easily generated in order to change the first service to the second service without a reduction in security for the second service.

For the change from the first service to the second service according to the present embodiment, the account generation supporting apparatus 101 does not issue a tentative password that temporarily enables the user to log into the managing apparatus 102. Thus, the user does not disclose personal information to be used in order to receive a tentative password. Since the account generation supporting apparatus 101 does not notify the user of a tentative password, security for the managing apparatus 102 is not reduced due to social hacking and the like. In addition, the encrypted password 122 is not provided to the account generation supporting apparatus 101. Thus, the account generation supporting apparatus 101 may not hold information on the encryption method used by the managing apparatus 102, specific information to be used for the encryption method, and the like.

If the authentication process is successful, the account generation supporting apparatus 101 may determine whether or not the received user ID 141 already exists in account information stored in the managing apparatus 102 before the generation of the account information described in the aforementioned term (3). If the received user ID 141 does not exist in the account information stored in the managing apparatus 102, the account generation supporting apparatus 101 causes the managing apparatus 102 to generate the account information. Thus, when the user changes a certain service regardless of what the user has already changed a service to the certain service, it is possible to inhibit account information including the user ID 141 from being redundantly registered in the managing apparatus 102.

If the authentication process is successful, the account generation supporting apparatus 101 may acquire user information other than the encrypted password from the managing apparatus 102. The user information includes the account information including the user ID and the encrypted password and includes information on a user, such as a user name registered by the user in order to create an account. The account generation supporting apparatus 101 may cause the managing apparatus 102 to generate user information including account information using the password 142 and the user information other than the encrypted password. Thus, user information for a service used before a change from the service to another service may be migrated to the managing apparatus 102 that executes the authentication process for the other service to be used after the change, and an operation of registering user information for the service to be used after the change may be reduced.

Second Example of Account Generation Support Method

Figure 2:
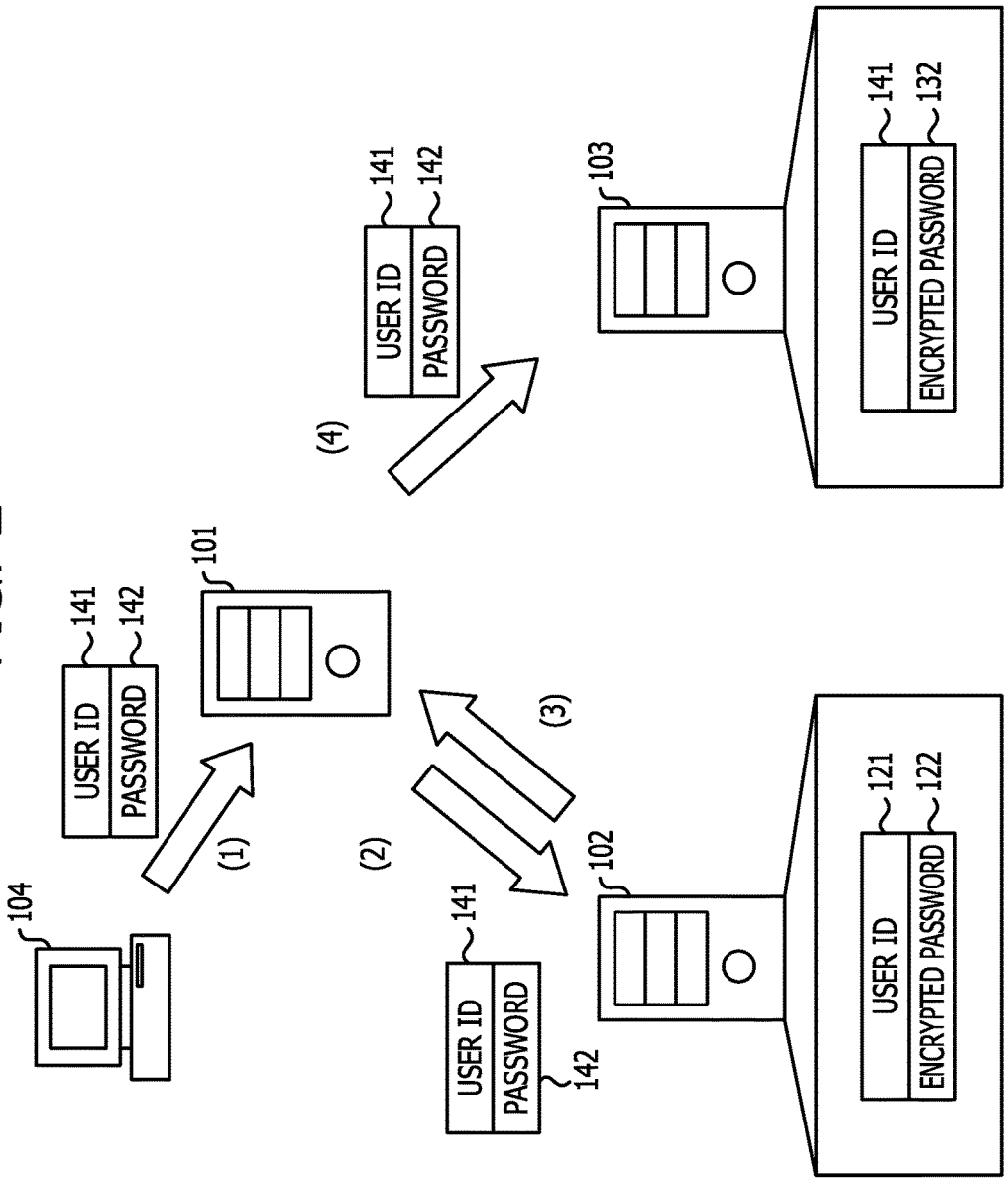
FIG. 2 is a diagram describing a second example of the account generation support method according to the first embodiment.

FIG. 2 is a diagram describing a second example of the account generation support method according to the first embodiment. The example illustrated in FIG. 2 describes a case in which the account generation supporting apparatus 101 does not function as a managing apparatus for executing the authentication process on a service. A description of parts that are illustrated in FIG. 2 and the same as those illustrated in FIG. 1 is omitted.

Referring to FIG. 2, the managing apparatus 102 is a computer configured to determine whether to authenticate the user of the first service used before the change from the first service to the second service. The managing apparatus 102 stores account information to be used to determine whether to authenticate the user of the first service. The account information includes a user ID 121 identifying the user of the first service and the password 122 encrypted by the encryption method of the managing apparatus 102. A managing apparatus 103 is a computer configured to determine whether to authenticate the user of the second service to be used after the change.

In the second example, the account generation supporting apparatus 101 receives a request to change the service from the client apparatus 104. The account generation supporting apparatus 101 acquires the user authentication information from the client apparatus 104. After that, the account generation supporting apparatus 101 cause the managing apparatus 102 to execute the authentication process using the user authentication information and the account information. After the authentication process succeeds, the account generation supporting apparatus 101 causes the managing apparatus 103 to generate account information. The second example of the account generation support method to be executed by the account generation supporting apparatus 101 is described below in detail.

(1) The account generation supporting apparatus 101 receives a request to change the service from the client apparatus 104 and acquires the user authentication information from the client apparatus 104. The account generation supporting apparatus 101 acquires, as the user authentication information, the user ID 141 and the password 142 associated with the user ID 141 from the client apparatus 104.

(2) The account generation supporting apparatus 101 causes the managing apparatus 102 to execute the authentication process. In this case, the managing apparatus 102 executes the authentication process using the account information including the user ID 121 stored in the managing apparatus 102 and the encrypted password 122 stored in the managing apparatus 102 and the user authentication information including the user ID 141 and the password 142. For example, if the user ID 141 matches the user ID 121, and the password 142 encrypted by the encryption method of the managing apparatus 102 matches the encrypted password 122, the managing apparatus 102 determines that the authentication process is successful.

(3) If the authentication process is successful, the account generation supporting apparatus 101 causes the managing apparatus 103 to generate account information. In this case, the account generation supporting apparatus 101 causes the managing apparatus 103 to generate the account information using the user ID 141 acquired from the client apparatus 104 and the password 142 acquired from the client apparatus 104. If the user ID 141 matches the user ID 121, the user ID 121 may be used instead of the user ID 141.

(4) The managing apparatus 103 uses an encryption method of the managing apparatus 103 to encrypt the password 142 acquired from the account generation supporting apparatus 101 and thereby generates an encrypted password 132 from the password 142. The managing apparatus 103 stores account information including the user ID 141 and the encrypted password 132.

As described above, the account generation supporting apparatus 101 may cause the managing apparatus 102 to execute the authentication process using the user ID 141 received from the client apparatus 104 and the password 142 associated with the user ID 141 and received from the client apparatus 104. If the authentication process is successful, the account generation supporting apparatus 101 may cause the managing apparatus 103 to generate account information using the received user ID 141 and the received password 142. Thus, the account information for the second service may be easily generated in order to change the first service to the second service without a reduction in the security for the second service.

Specifically, for the change from the first service to the second service according to the present embodiment, the user performs an operation of logging into the service used before the change, and the account generation supporting apparatus 101 may coordinate with the service used before the change and the service to be used after the change and generate the account information for the service to be used after the change as a result of the login operation.

Example of Configuration of System 300

Figure 3:
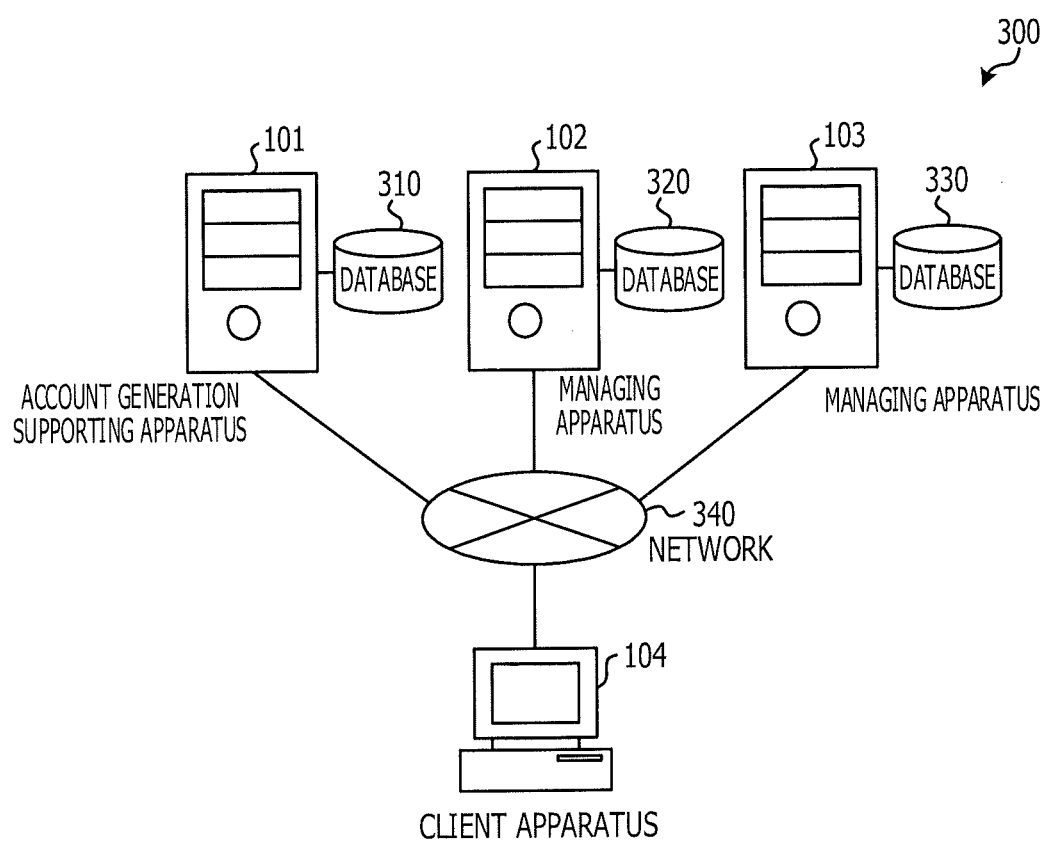
FIG. 3 is a diagram illustrating an example of a configuration of a system.

FIG. 3 is a diagram illustrating an example of a configuration of a system 300. Referring to FIG. 3, the system 300 includes the account generation supporting apparatus 101, the managing apparatus 102, the managing apparatus 103, and the client apparatus 104. In the system 300, the account generation supporting apparatus 101, the managing apparatus 102, the managing apparatus 103, and the client apparatus 104 are connected to each other through a wired or wireless network 340. The network 340 is, for example, a local area network (LAN), a wide area network (WAN), the Internet, or the like.

The account generation supporting apparatus 101 is a computer configured to support the generation of account information to be used to change a service. The account generation supporting apparatus 101 may be a managing apparatus configured to determine whether to authenticate a user of a service. In this case, the account generation supporting apparatus 101 has a database 310 for storing account information including a user ID and an encrypted password and user information including information on a user, such as a user name registered by the user in order to create an account.

Figure 4:
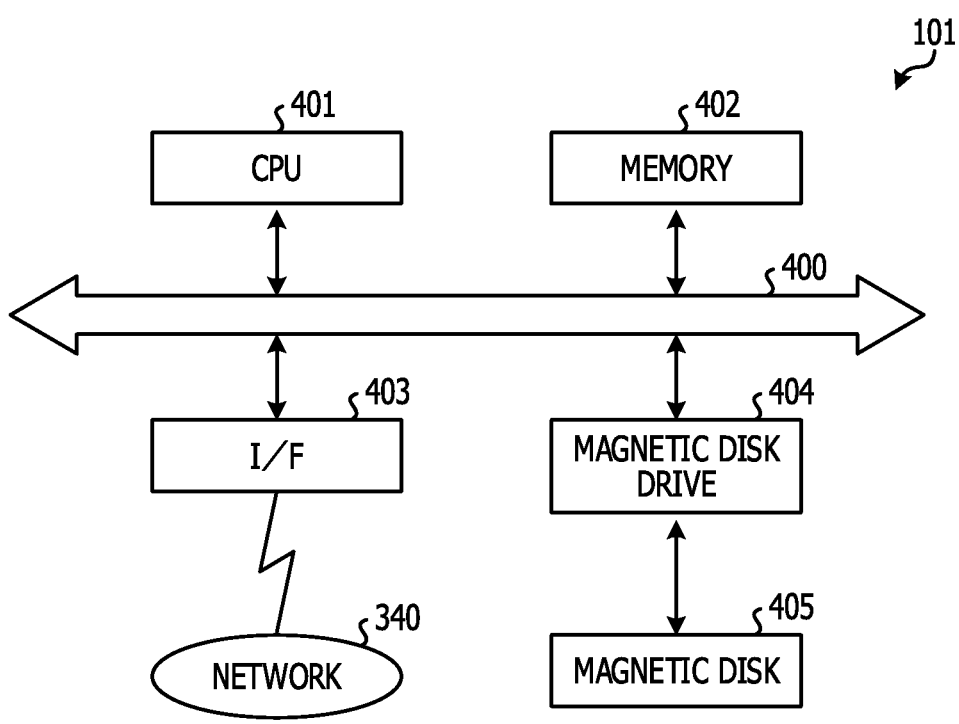
FIG. 4 is a block diagram illustrating an example of a hardware configuration of an account generation supporting apparatus.

The managing apparatus 102 is a computer configured to determine whether to authenticate a user of a service. The managing apparatus 102 has a database 320 for storing the user information. The managing apparatus 103 is a computer configured to determine whether to authenticate a user of a service. The managing apparatus 103 has a database 330 for storing the user information. The databases 310 to 330 are generated on magnetic disks 405 (described later) of the apparatuses 101 to 103, for example. The magnetic disk 405 of the account generation supporting apparatus 101 is illustrated in FIG. 4.

The account generation supporting apparatus 101, the managing apparatus 102, and the managing apparatus 103 may be computers configured to provide the first service and the second service to a user. The first service and the second service may be provided by a computer that is not illustrated in FIG. 3. For example, the first service and the second service are directory services. The directory services are systems that enable resources of the network and attributes of the network to be stored and enable the resources and the attributes to be searched and found. For example, the directory services each have a function of storing a location of data and a location of a program and responding to the user so as to notify the user of the location of the data and the location of the program based on a name of the data and a name of the program. Thus, the user may use the data and the program without considering which server stores the data and the program.

The client apparatus 104 is a computer to be used by the user of the system 300. The client apparatus 104 is, for example, a personal computer (PC), a laptop PC, a smartphone, a mobile phone, a tablet PC, or the like.

Example of Hardware Configuration of Account Generation Supporting Apparatus 101

FIG. 4 is a block diagram illustrating an example of a hardware configuration of the account generation supporting apparatus 101. Referring to FIG. 4, the account generation supporting apparatus 101 includes a central processing unit (CPU) 401, a memory 402, an interface (I/F) 403, and a magnetic disk drive 404, and a magnetic disk 405. The constituent parts 401 to 405 are connected to each other by a bus 400.

The CPU 401 controls the overall account generation supporting apparatus 101. The memory 402 includes a read only memory (ROM), a random access memory (RAM), a flash ROM, and the like, for example. Specifically, the flash ROM and the ROM store various programs, while the RAM is used as a work area of the CPU 401. The programs stored in the memory 402 are loaded by the CPU 401 and thereby cause the CPU 401 to execute coded processes.

The I/F 403 is connected to the network 340 through a communication line and connected to another computer (for example, the client apparatus 104 illustrated in FIG. 3) through the network 340. The I/F 403 serves as an internal interface with the network 340 and controls input and output of data from and to the other computer. As the I/F 403, a modem, a LAN adapter, or the like may be used, for example.

The magnetic disk drive 404 controls reading and writing of data from and in the magnetic disk 405 in accordance with control of the CPU 401. The magnetic disk 405 stores data written in accordance with control of the magnetic disk drive 404.

The account generation supporting apparatus 101 may include a solid state drive (SSD), a keyboard, a mouse, and a display, as well as the aforementioned constituent units, for example. The managing apparatus 102 (illustrated in FIG. 3), the managing apparatus 103 (illustrated in FIG. 3), and the client apparatus 104 (illustrated in FIG. 3) may be each achieved by the same hardware configuration as the example of the hardware configuration of the account generation supporting apparatus 101.

Example of User Authentication Information

FIG. 5 is a diagram illustrating an example of the user authentication information. User authentication information 501 is used to determine whether or not the user is authenticated. The user authentication information 501 includes a user ID identifying the user and a plain text user password. The user enters the user ID and the user password on a screen of the client apparatus 104, and the user authentication information 501 is transmitted from the client apparatus 104 to the account generation supporting apparatus 101.

Example of User Information for Directory Service Used Before Change

FIG. 6 is a diagram illustrating an example of user information for the directory service used before the change. User information 601 is an example of the user information stored on the database of the account generation supporting apparatus 101, the database of the managing apparatus 102, and the database of the managing apparatus 103 if the first service and the second service are the directory services.

The user information 601 includes information specific to the directory services, account information, and information on the user. Attribute names that represent attributes are added to the information. The information specific to the directory services is information that is included in the user information only when the services are the directory services. For example, the information specific to the directory services includes a distinguished name (DN) used to represent an object and an object type (objectClass) representing the type of the object. The account information includes a user ID (uid) and an encrypted user password (userPassword). The information on the user includes a full name (cn), a family name (sn), a first name (givenName), and a mail address (mail). The symbols within the parentheses represent the attribute names.

The user information 601 is acquired by the account generation supporting apparatus 101 from a managing apparatus that executes the authentication process for the service used before the change. In the example illustrated in FIG. 1, the account generation supporting apparatus 101 generates the user information 601. In the example illustrated in FIG. 2, the account generation supporting apparatus 101 acquires the user information 601 from the managing apparatus 102.

Example of User Information for Directory Service to be Used After Change

FIG. 7 is a diagram illustrating an example of user information for the directory service to be used after the change. User information 701 is an example of the user information stored on the database of the account generation supporting apparatus 101, the database of the managing apparatus 102, and the database of the managing apparatus 103 if the first service and the second service are the directory services.

The user information 701 includes information equivalent with the user information 601. If software that achieves the service used before the change is different from software that achieves the service to be used after the change, attribute names of the same information included in the user information 601 and 701 may be different. For example, an attribute name of an encrypted user password of the user information 601 is userPassword, while an attribute name of an encrypted user password of the user information 701 is unicodePwd.

The user information 701 is generated by the account generation supporting apparatus 101. Thus, the encrypted user password (unicodePwd) is blank. The managing apparatus that executes the authentication process for the service to be used after the change generates user information based on the password of the user information 701 and the password of the user information 501. In the examples illustrated in FIGS. 1 and 2, the account generation supporting apparatus 101 generates the user information 701.

Example of Functional Configuration of Account Generation Supporting Apparatus 101

Figure 8:
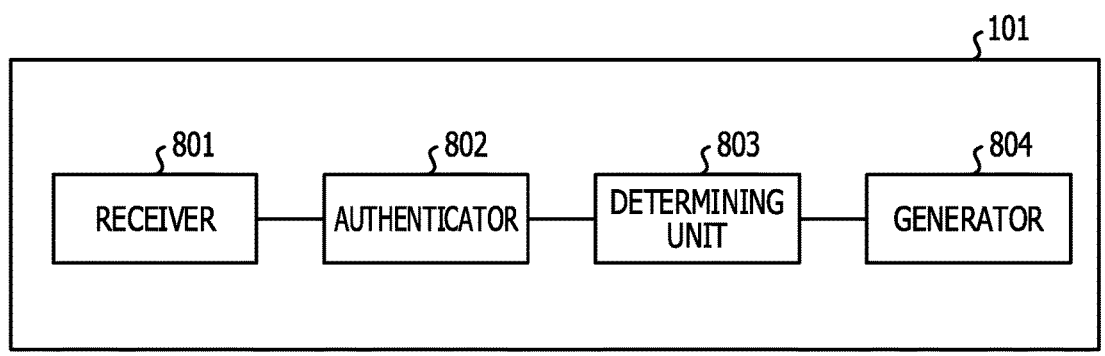
FIG. 8 is a block diagram illustrating an example of a functional configuration of the account generation supporting apparatus.

FIG. 8 is a block diagram illustrating an example of a functional configuration of the account generation supporting apparatus 101. FIG. 8 illustrates the example of the functional configuration provided to support the generation of account information and included in the account generation supporting apparatus 101, and the functional configuration does not include a configuration to determine whether to authenticate a user of a service. Referring to FIG. 8, the account generation supporting apparatus 101 includes a receiver 801, an authenticator 802, a determining unit 803, and a generator 804. Functions of the functional units 801 to 804 are achieved by the I/F 403 or by causing the CPU 401 to execute programs stored in storage devices such as the memory 402 (illustrated in FIG. 4), the magnetic disk 405 (illustrated in FIG. 4), and the like. Results of processes executed by the functional units are stored in the storage devices such as the memory 402 (illustrated in FIG. 4), the magnetic disk 405 (illustrated in FIG. 4), and the like.

The receiver 801 has a function of acquiring the user authentication information. Specifically, the receiver 801 causes the client apparatus 104 to display a screen for receiving a request to change a service and receives the user authentication information entered by the user, for example. An example of the screen for receiving a request to change a service is described below.

Figure 9:
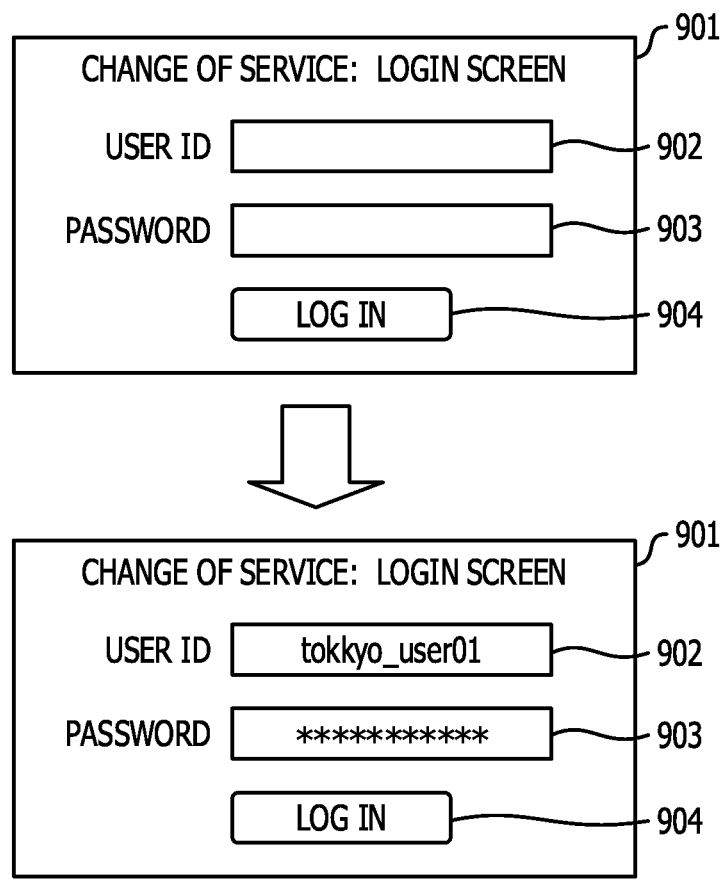
FIG. 9 is a diagram illustrating an example of a screen for receiving a request to change a service.

FIG. 9 is a diagram illustrating an example of the screen for receiving a request to change a service. Referring to FIG. 9, a screen 901 is a login screen for receiving a request to change a service. The account generation supporting apparatus 101 causes the client apparatus 104 to display the screen 901 using a web browser of the client apparatus 104, for example.

The screen 901 includes a box 902 for entering a user ID and a box 903 for entering a password. The user uses a keyboard (not illustrated) of the client apparatus 104 or a mouse (not illustrated) of the client apparatus 104 to enter a user ID and a password on the screen 901. The information (that is the user ID and the password) entered in the boxes 902 and 903 is transmitted to the account generation supporting apparatus 101 by clicking a login button 904 on the screen 901. The receiver 801 acquires, as the user authentication information, the user ID and the password that have been transmitted from the client apparatus 104.

In the examples illustrated in FIGS. 1 and 2, the user changes the first service to the second service. Thus, the receiver 801 acquires the user authentication information provided for the first service and to be used to determine whether or not the user is authenticated.

The authenticator 802 has a function of causing a managing apparatus, configured to determine whether to authenticate a user of the service used before the change using the user authentication information acquired by the receiver 801, to execute the authentication process. In the example illustrated in FIG. 1, the authenticator 802 executes the authentication process in the account generation supporting apparatus 101 using the user authentication information acquired by the receiver 801. In the example illustrated in FIG. 2, the authenticator 802 causes the managing apparatus 102 to execute the authentication process using the user authentication information acquired by the receiver 801.

The determining unit 803 has a function of determining whether or not the user ID of the user authentication information used for the execution of the authentication process by the authenticator 802 already exists in account information stored in a managing apparatus that determines whether to authenticate the user of the service to be used after the change. If the user ID of the user authentication information already exists in the account information stored in the managing apparatus that determines whether to authenticate the user of the service to be used after the change, the change is already terminated. Thus, the account generation supporting apparatus 101 notifies the client apparatus 104 that the service has been changed, and the account generation supporting apparatus 101 terminates the generation of an account.

The determining unit 803 makes a determination as follows. If the managing apparatus that determines whether to authenticate the user of the service to be used after the change has an administrative right, the account generation supporting apparatus 101 acquires all user information from the managing apparatus that determines whether to authenticate the user of the service to be used after the change. The determining unit 803 confirms whether or not the user ID included in the user authentication information acquired by the receiver 801 matches any of user IDs of the acquired user information. If the user ID included in the user authentication information acquired by the receiver 801 matches any of user IDs of the acquired user information, the determining unit 803 determines that the user ID included in the user authentication information used for the execution of the authentication process by the authenticator 802 already exists in the account information stored in the managing apparatus that determines whether to authenticate the user of the service to be used after the change.

In another method, the determining unit 803 causes the managing apparatus that determines whether to authenticate the user of the service to be used after the change to execute the authentication process using the user ID and the password that are included in the user authentication information acquired by the receiver 801. If the authentication process is successful, the determining unit 803 determines that the user ID included in the user authentication information used for the execution of the authentication process by the authenticator 802 already exists in the account information stored in the managing apparatus that determines whether to authenticate the user of the service to be used after the change.

The generator 804 has a function of causing a managing apparatus that determines whether to authenticate the user of the service to be used after the change to generate account information using the user ID and the password that are included in the user authentication information acquired by the receiver 801. In the example illustrated in FIG. 1, the generator 804 causes the managing apparatus 102 to generate the account information using the user authentication information acquired by the receiver 801. In the example illustrated in FIG. 2, the generator 804 causes the managing apparatus 103 to generate the account information using the user authentication information acquired by the receiver 801.

In addition, the generator 804 may acquire user information other than an encrypted password from a managing apparatus that determines whether to authenticate the user of the service used before the change. In this case, the generator 804 causes the managing apparatus that determines whether to authenticate the user of the service to be used after the change to generate the user information using the password included in the user authentication information acquired by the receiver 801 and the user information other than an encrypted password.

The generator 804 may have a function of determining types of the software that achieves the service used before the change and the service to be used after the change and have a function of recognizing a difference between attribute names of user information used by the software that achieves the services. Thus, even if an attribute name of user information for the service used before the change is different from an attribute name of user information for the service to be used after the change, user information that is to be provided for the service to be used after the change and excludes an encryption password may be generated from the user information for the service used before the change.

For example, an attribute name of an encrypted password for software to be used for the directory service described with reference to FIG. 6 is userPassword, while an attribute name of an encrypted password for software to be used for the directory service described with reference to FIG. 7 is unicodePwd. In this case, the generator 804 may generate, from the user information for the service used before the change, user information that is provided for the service to be used after the change and excludes an encrypted password.

Figure 10:
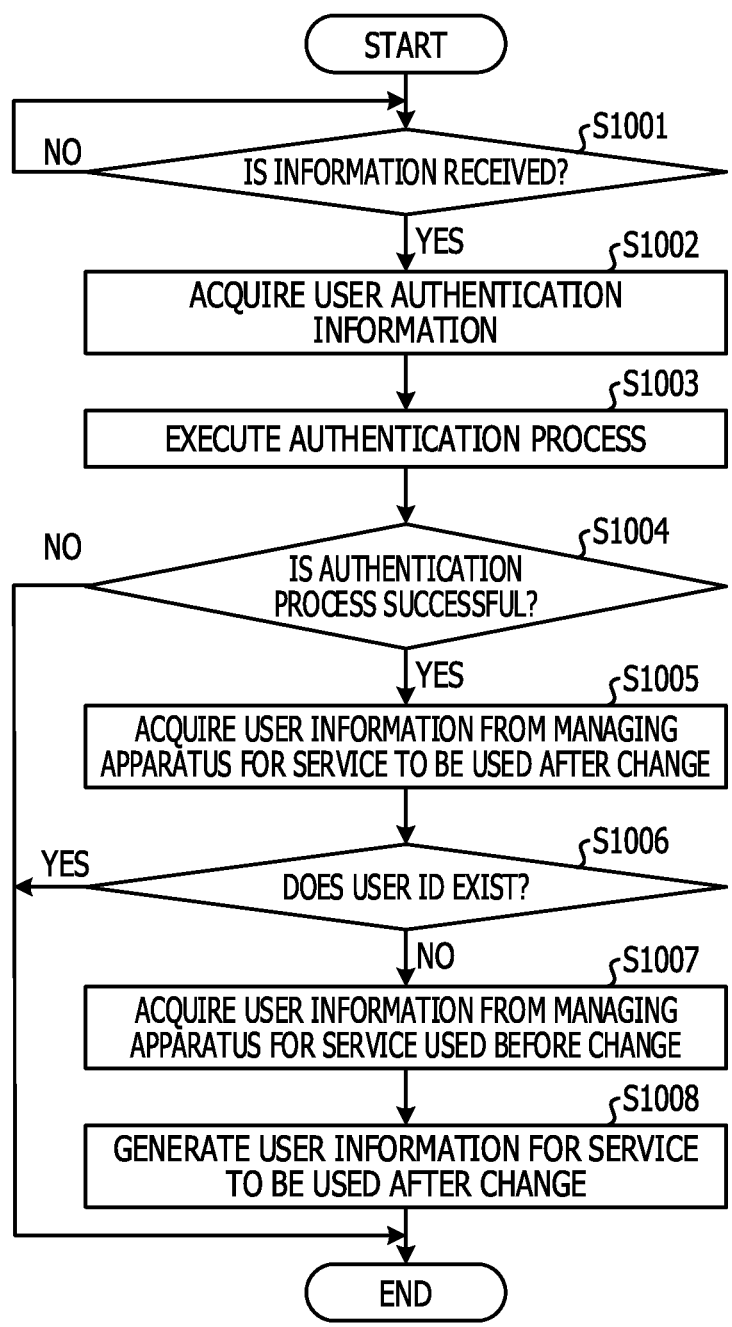
FIG. 10 is a flowchart of an example of a procedure for an account generation support process to be executed by the account generation supporting apparatus.

FIG. 10 is a flowchart of an example of a procedure for an account generation support process to be executed by the account generation supporting apparatus 101. In the flowchart illustrated in FIG. 10, the receiver 801 waits to receive information from the client apparatus 104 (in step S1001). If the receiver 801 does not receive the information from the client apparatus 104 (No in step S1001), the receiver 801 executes step S1001 again and waits to receive the information from the client apparatus 104. If the receiver 801 receives the information from the client apparatus 104 (Yes in step S1001), the account generation supporting apparatus 101 causes the process to proceed to step S1002.

Next, the receiver 801 acquires, from the client apparatus 104, user authentication information including a user ID entered by the user and a password entered by the user (in step S1002). The authenticator 802 causes a managing apparatus that determines whether to authenticate the user of the service used before the change to execute the authentication process using the user authentication information acquired by the receiver 801 (in step S1003).

Next, the authenticator 802 confirms whether or not the authentication process is successful (in step S1004). If the authentication process fails (No in step S1004), the account generation support process is treated as an error and terminated. For example, the account generation supporting apparatus 101 causes the client apparatus 104 to display a screen representing the error and thereby notifies the user that the authentication process that is executed on the user of the service used before the change using the user ID entered by the user and the password entered by the user fails. If the authentication process is successful (Yes in step S1004), the account generation supporting apparatus 101 causes the process to proceed to step S1005.

The determining unit 803 acquires all user information from a managing apparatus that determines whether to authenticate the user of the service to be used after the change (in step S1005). Then, the determining unit 803 confirms whether or not the user ID included in the user authentication information acquired by the receiver 801 matches any of user IDs included in the user information acquired (in step S1006).

If the user ID included in the user authentication information acquired by the receiver 801 matches any of the user IDs included in the user information acquired (Yes in step S1006), the account generation support process is treated as an error and terminated. For example, the account generation supporting apparatus 101 causes the client apparatus 104 to display a screen representing the error and thereby notifies the user that the user ID entered by the user already exists in the account information stored in the managing apparatus that determines whether to authenticate the user of the service to be used after the change. If the user ID included in the user authentication information acquired by the receiver 801 does not match any of the user IDs included in the user information acquired (No in step S1006), the account generation supporting apparatus 101 causes the process to proceed to step S1007.

The generator 804 acquires user information other than an encrypted password from the managing apparatus that determines whether to authenticate the user of the service used before the change (in step S1007). Next, the generator 804 causes the managing apparatus that determines whether to authenticate the service to be used after the change to generate user information including the account information using the password included in the user authentication information acquired by the receiver 801 and the user information other than an encrypted password (in step S1008). Then, the process executed according to the flowchart of FIG. 10 is terminated. As a result of the execution of the process according to the flowchart of FIG. 10, the user information that includes the account information is generated based on the user authentication information acquired by the receiver 801 within the managing apparatus that determines whether to authenticate the user of the service to be used after the change.

As described above, the account generation supporting apparatus 101 according to the first embodiment causes a first managing apparatus to execute the authentication process using a user ID received from the client apparatus 104 and a password associated with the user ID and received from the client apparatus 104. If the authentication process is successful, the account generation supporting apparatus 101 may cause a second managing apparatus that determines whether to authenticate the user of the second service to be used after the change to generate account information using the received user ID and the received password.

Since the account generation supporting apparatus 101 does not issue a tentative password to be used to log into the service to be used after the change, the user does not disclose personal information to be used in order to notify the user of a tentative password. In addition, since a tentative password is not provided to the user, it is possible to inhibit the security for the service to be used after the change from being reduced due to social hacking or the like. Since information on the encryption method used for the service to be used after the change, specific information used for the encryption method, and the like are not disclosed to the account generation supporting apparatus 101, it is possible to inhibit the security for the service to be used after the change from being reduced.

The account generation supporting apparatus 101 may determine whether or not the received user ID 141 already exists in the account information stored in the second managing apparatus. It is, therefore, possible to inhibit account information including the user ID 141 from being redundantly registered in the second managing apparatus.

In addition, the account generation supporting apparatus 101 may acquire user information other than an encrypted password from the first managing apparatus and cause the second managing apparatus to generate user information including account information. Thus, user information for the service used before the change may be migrated to the second managing apparatus that executes the authentication process on the service to be used after the change, and an operation of registering user information for the service to be used after the change may be reduced. In addition, since an erroneous entry by the user may be avoided, it is possible to inhibit the fact that the service to be used after the change is unable to be used with the same password as the service used before the change.

Second Embodiment

Figure 11:
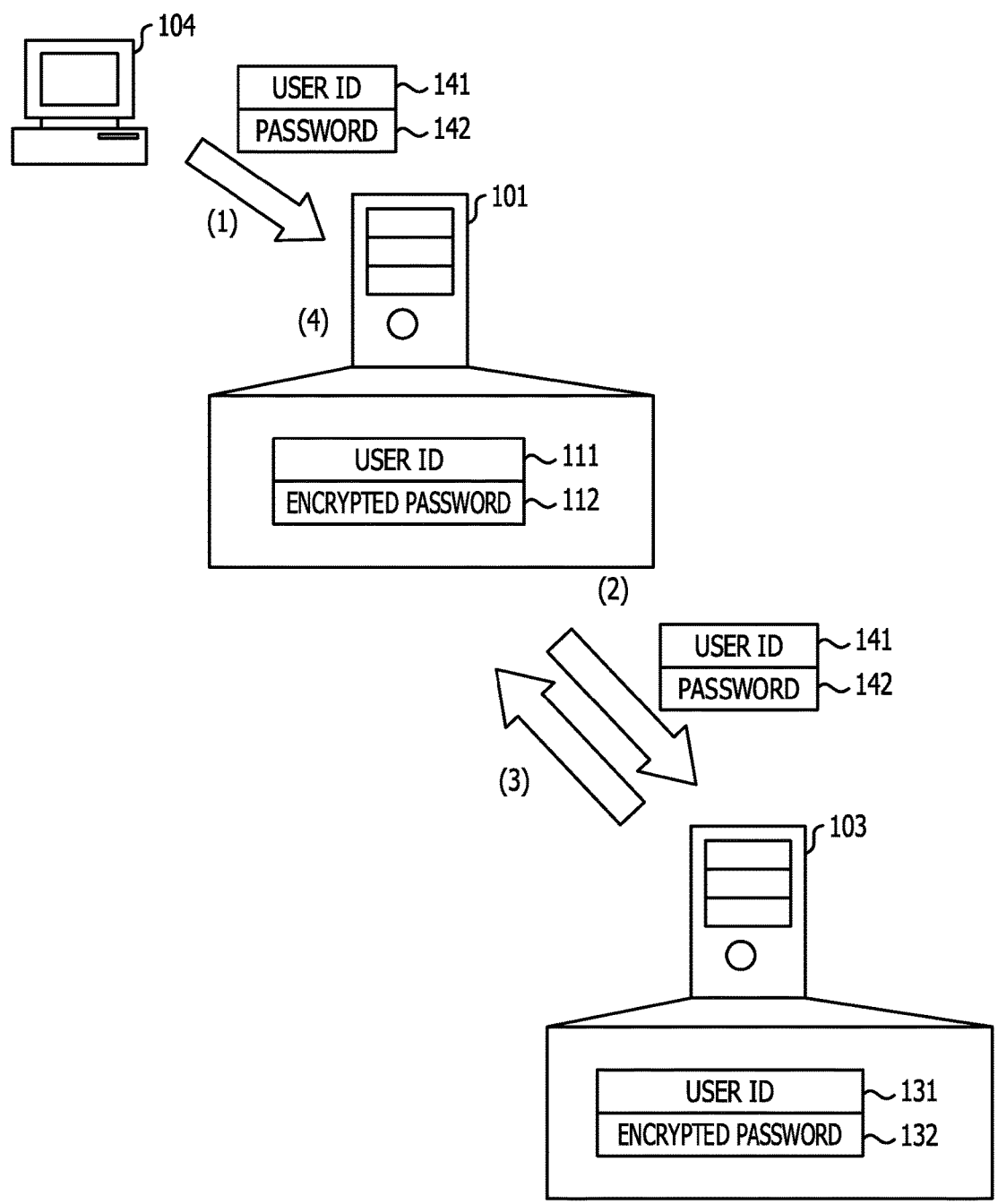
FIG. 11 is a diagram describing an example of an account generation support method according to a second embodiment.

FIG. 11 is a diagram describing an example of an account generation support method according to a second embodiment. The example illustrated in FIG. 11 describes a case in which the account generation supporting apparatus 101 functions as a managing apparatus configured to execute the authentication process on the second service that is the service to be used after the change. A description and illustration of parts that are illustrated in FIG. 11 and the same as those described in the first embodiment are omitted.

Referring to FIG. 11, the managing apparatus 103 is a computer configured to determine whether to authenticate the user of the first service used before the change. The managing apparatus 103 stores account information to be used to determine whether to authenticate the user of the first service. The account information includes a user ID 131 identifying the user of the first service and a password 132 encrypted by the encryption method of the managing apparatus 103.

In the present embodiment, the account generation supporting apparatus 101 receives a request to change the service from the client apparatus 104. The account generation supporting apparatus 101 acquires the user authentication information from the client apparatus 104. After that, the account generation supporting apparatus 101 causes the managing apparatus 103 to execute the authentication process using the user authentication information and the account information. After the authentication process succeeds, the account generation supporting apparatus 101 generates account information within the account generation supporting apparatus 101. A method for generating the account information by the account generation supporting apparatus 101 is described below in detail.

(1) The account generation supporting apparatus 101 receives the request to change the service from the client apparatus 104 and acquires the user authentication information from the client apparatus 104. The account generation supporting apparatus 101 acquires, as the user authentication information, the user ID 141 and the password 142 associated with the user ID 141 from the client apparatus 104.

(2) The account generation supporting apparatus 101 causes the managing apparatus 103 to execute the authentication process. The managing apparatus 103 executes the authentication process using the account information including the user ID 131 stored in the managing apparatus 103 and the encrypted password 132 stored in the managing apparatus 103 and the user authentication information including the user ID 141 and the password 142. For example, if the user ID 141 matches the user ID 131 and the password 142 encrypted by the encryption method of the managing apparatus 103 matches the encrypted password 132, the managing apparatus 103 determines that the authentication process is successful.

(3) If the authentication process is successful, the account generation supporting apparatus 101 generates the account information within the account generation supporting apparatus 101. In this case, the account generation supporting apparatus 101 generates the account information using the user ID 141 acquired from the client apparatus 104 and the password 142 acquired from the client apparatus 104 within the account generation supporting apparatus 101. If the user ID 141 matches the user ID 131, the user ID 131 may be used instead of the user ID 141.

(4) The account generation supporting apparatus 101 encrypts the password 142 acquired from the client apparatus 104 using the encryption method of the account generation supporting apparatus 101 and thereby generates the encrypted password 112. The account generation supporting apparatus 101 stores account information including the user ID 111 and the encrypted password 112. Thus, the account generation supporting apparatus 101 may easily generate the account information for the second service in order to change the first service to the second service without reducing the security for the second service.

As described above, the account generation supporting apparatus 101 may cause the managing apparatus 103 to execute the authentication process using the user ID 141 received from the client apparatus 104 and the password 142 associated with the user ID 141 and received from the client apparatus 104. If the authentication process is successful, the account generation supporting apparatus 101 may generate account information within the account generation supporting apparatus 101 using the received user ID 141 and the received password 142.

Specifically, for the change from the first service to the second service according to the present embodiment, when the user logs into the service used before the change, the account generation supporting apparatus 101 may coordinate with the service used before the change and generate account information for the service to be used after the change as a result of the login operation.

An account generation support program that achieves the present embodiment may be achieved by causing a computer such as a personal computer or a workstation to execute a prepared program. The account generation support program is stored in a computer-readable recording medium such as a hard disk, a flexible disk, a CD-ROM, a magneto-optical (MO) disc, or a DVD. The account generation support program is read from the computer-readable recording medium by the computer and executed by the computer. The account generation support program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising: a memory; and a processor coupled to the memory and configured to:
   receive, from a client device, a request for changing from a first service to a second service,
   receive, from the client device, a password of a target user and a user identifier for identifying the target user,
   cause a first management device to authenticate the target user, by causing the first management device to generate a first encrypted password by encrypting the received password of the target user by using a first encryption method and to compare the generated first encrypted password with an encrypted password stored in the first management device,
   in response to the target user being authenticated by the first management device, acquire, from a second management device, a plurality of user information respectively including a combination of a user identifier to identify a user of the second service and an encrypted password of the user of the second service, the encrypted password being generated by encrypting a password of the user by using a second encryption method different from the first encryption method,
   determine whether a user identifier which is same as the user identifier of the target user exists in the plurality of user information,
   in response to determining that the user identifier which is the same as the user identifier of the target user exist in the plurality of user information, transmit the user identifier of the target user and the password of the target user to the second management device, and
   cause the second management device to generate a second encrypted password used for authenticating the target user, by encrypting the password of the target user by using the second encryption method.

2. The apparatus according to claim 1, wherein the processor is further configured to display a screen on a display of the client device to receive the password and the identification information entered by the user, when the request is received from the client device.

3. The apparatus according to claim 1, wherein the processor is configured to cause the second management device to compare the second encrypted password with the password to authenticate the user of the second service when the second service is accessed using the user identifier and the password.

4. The apparatus according to claim 1, wherein the user identifier is an identification of a user who has successfully accessed the first service and will access the second service, and the password is associated with the identification of the user.

5. The apparatus according to claim 1, wherein the processor is further configured to: determine whether the second service has the second encrypted password, and provide the second service with the user identifier and the password when it is determined that the second service does not have the second encrypted password.

6. The apparatus according to claim 1, wherein the apparatus is a single server.

7. The apparatus according to claim 1, wherein the memory is configured to store a program, the program causing the processor to authenticate the user of the first service and provide the second service with the user identifier and the password.

8. The apparatus according to claim 1, wherein the processor is further configured to display an error message on a display of the client device when determining that the received user identifier exists in the plurality of user information.

9. The apparatus according to claim 1, wherein the processor is further configured to:
   acquire, from the first management device, information of a user who requested the changing other than the password and the user identifier, and
   transmitting the acquired information to the second management device to cause the second management device to generate user information including the second encrypted password and the acquired information.

10. The apparatus according to claim 1, wherein the processor is further configured to cause the client device to display an image representing an error, when determining that the user identifier exists in the plurality of user information.

11. The apparatus according to claim 1,
   wherein the second management device stores a combination of the user identifier of the target user and the generated second encrypted password so that the second management device is capable of authenticating the target user when using the second service.

12. The apparatus according to claim 1,
wherein the plurality of user information respectively includes a distinguished name used to represent an object and an object type representing a type of the object.

13. The apparatus according to claim 12,
wherein the plurality of user information respectively includes a name and a mail address of the user.

14. A non-transitory computer-readable medium including a program that causes a computer to execute a process comprising:
receiving, from a client device, a request for changing from a first service to a second service,
receiving, from the client device, a password of a target user and a user identifier for identifying the target user,
causing a first management device to authenticate the target user, by causing the first management device to generate a first encrypted password by encrypting the received password of the target user by using a first encryption method and to compare the generated first encrypted password with an encrypted password stored in the first management device,
in response to the target user being authenticated by the first management device, acquiring, from a second management device, a plurality of user information respectively including a combination of a user identifier to identify a user of the second service and an encrypted password of the user of the second service, the encrypted password being generated by encrypting a password of the user by using a second encryption method different from the first encryption method,
determining whether a user identifier which is same as the user identifier of the target user exists in the plurality of user information,
in response to determining that the user identifier which is the same as the user identifier of the target user exist in the plurality of user information, transmitting the user identifier of the target user and the password of the target user to the second management device, and
causing the second management device to generate a second encrypted password used for authenticating the target user, by encrypting the password of the target user by using the second encryption method.

15. A method executed by a processor included in an apparatus, the method comprising:
receiving, from a client device, a request for changing from a first service to a second service,
receiving, from the client device, a password of a target user and a user identifier for identifying the target user,
causing a first management device to authenticate the target user, by causing the first management device to generate a first encrypted password by encrypting the received password of the target user by using a first encryption method and to compare the generated first encrypted password with an encrypted password stored in the first management device,
in response to the target user being authenticated by the first management device, acquiring, from a second management device, a plurality of user information respectively including a combination of a user identifier to identify a user of the second service and an encrypted password of the user of the second service, the encrypted password being generated by encrypting a password of the user by using a second encryption method different from the first encryption method,
determining whether a user identifier which is same as the user identifier of the target user exists in the plurality of user information,
in response to determining that the user identifier which is the same as the user identifier of the target user exist in the plurality of user information, transmitting the user identifier of the target user and the password of the target user to the second management device, and
causing the second management device to generate a second encrypted password used for authenticating the target user, by encrypting the password of the target user by using the second encryption method.

* * * * *